(12) United States Patent
Soucy

(10) Patent No.: US 8,814,495 B1
(45) Date of Patent: Aug. 26, 2014

(54) WIND BLADE DEVICE

(76) Inventor: Douglas Soucy, Buckeye, AZ (US)

(*) Notice: Subject to any disclaimer, the term of this patent is extended or adjusted under 35 U.S.C. 154(b) by 720 days.

(21) Appl. No.: 12/930,211

(22) Filed: Dec. 30, 2010

Related U.S. Application Data

(60) Provisional application No. 61/341,138, filed on Mar. 26, 2010.

(51) Int. Cl.
*F03D 7/06* (2006.01)

(52) U.S. Cl.
USPC ............. 415/4.2; 415/4.4; 415/907; 416/242; 416/197 A

(58) Field of Classification Search
USPC ........... 415/4.2, 4.4, 907; 416/DIG. 9, 132 B, 416/242, 243, 197 A, 197 B, 197 R
See application file for complete search history.

(56) References Cited

U.S. PATENT DOCUMENTS

| | | | |
|---|---|---|---|
| 3,373,821 A | 3/1968 | Sare | |
| 3,942,909 A | 3/1976 | Yengst | |
| 4,049,362 A * | 9/1977 | Rineer | 416/119 |
| 4,218,183 A | 8/1980 | Dall-Winther | |
| 7,287,954 B2 * | 10/2007 | Kinkaid et al. | 415/4.2 |
| 2005/0025624 A1 * | 2/2005 | Pierson | 416/197 A |
| 2006/0153682 A1 * | 7/2006 | Vanderhye et al. | 416/197 A |

* cited by examiner

*Primary Examiner* — Edward Look
*Assistant Examiner* — Maxime Adjagbe

(57) ABSTRACT

A wind blade device for rotating a wind turbine is provided. The wind turbine generates wind-generated electric power in residential, business, industrial, and electric utility applications. The wind blade device comprises a drive shaft mountable to the wind turbine. A first wing extends from one side of the drive shaft and a second wing extends from an opposite side of the drive shaft. At least a portion of the first wing distant from the drive shaft is curved in a first direction and at least a portion of the second wing distant from the drive shaft is curved in a second direction. The first wing and the second wing maximize surface area to the wind and receive the wind from any direction.

18 Claims, 2 Drawing Sheets

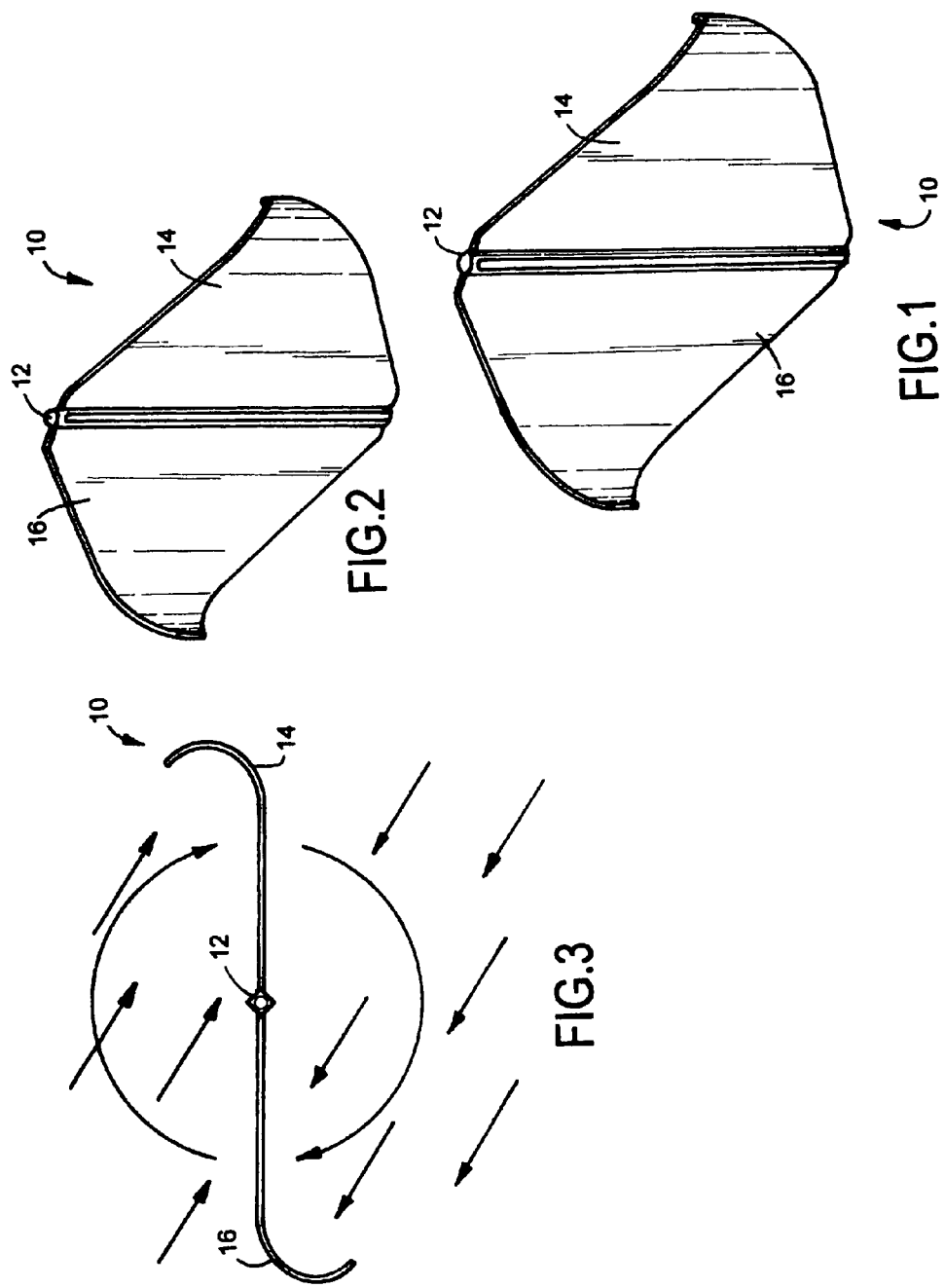

WIND BLADE DEVICE

The present application claims the benefit of priority of provisional patent application Ser. No. 61/341,138, filed on Mar. 26, 2010, entitled "Wind Blade".

BACKGROUND OF THE INVENTION

1. Field of the Invention

This invention relates generally to a wind blade device and, more particularly, the invention relates to a wind blade device designed to turn the vertical drive shaft of a vertical-axis wind turbine while presenting the greatest surface area to the wind, and receiving the wind from any direction.

2. Description of the Prior Art

To date, the prevailing design for wind-turbines has favored "horizontal-axis" turbines (HAWT), in which a tall tower supports a massive, vertically oriented set of blades, like a propeller, which rotate in the wind to turn a horizontally oriented drive shaft, this shaft in turn rotating a generator. Among the HAWT's advantages are their popularity: horizontal-axis turbines are the existing technology used in wind farms around the world, making them the "accepted standard"; horizontal-axis turbine technology also enjoys an established parts-supply chain. These turbines are manufactured, erected, and managed by well-organized, large corporations; and their fundamental design goes back centuries.

The horizontal-axis wind turbines, however, also present disadvantages. These include efficiency, expense, height, coping with changes in wind direction, maintenance, and excessive noise. The alternative, one that eliminates many of the disadvantages of the horizontal-axis machines, is a Vertical Axis Wind Turbine, or VAWT in which the blades of the turbine are mounted not on a horizontal drive shaft but atop a vertical drive shaft, the result of which is improved energy-efficiency and performance at a lower cost, and at lower tower-heights.

SUMMARY

The present invention is a wind blade device for rotating a wind turbine. The wind turbine generates wind-generated electric power in residential, business, industrial, and electric utility applications. The wind blade device comprises a drive shaft mountable to the wind turbine. A first wing extends from one side of the drive shaft and a second wing extends from an opposite side of the drive shaft. At least a portion of the first wing distant from the drive shaft is curved in a first direction and at least a portion of the second wing distant from the drive shaft is curved in a second direction. The first wing and the second wing maximize surface area to the wind and receive the wind from any direction.

In addition, the present invention includes a method for rotating a wind turbine. The wind turbine generates wind-generated electric power in residential, business, industrial, and electric utility applications. The method comprises mounting a drive shaft to the wind turbine, extending a first wing from one side of the drive shaft, extending a second wing from an opposite side of the drive shaft, curving at least a portion of the first wing distant from the drive shaft in a first direction, curving at least a portion of the second wing distant from the drive shaft in a second direction, maximizing the surface area of the first wing and the second wing, and receiving the wind from any direction.

The present invention further includes a wind blade device for rotating a wind turbine. The wind turbine generates wind-generated electric power in residential, business, industrial, and electric utility applications. The wind blade device comprises a drive shaft mountable to the wind turbine. A triangular-shaped first wing extends from one side of the drive shaft and a triangular-shaped second wing extends from an opposite side of the drive shaft. At least a portion of the first wing distant from the drive shaft is curved in a first direction and at least a portion of the second wing distant from the drive shaft is curved in a second direction with the first direction being substantially opposite the second direction. The first wing and the second wing maximize surface area to the wind and receive the wind from any direction.

BRIEF DESCRIPTION OF THE DRAWINGS

FIG. 1 is an elevational front view illustrating a wind blade device, constructed in accordance with the present invention, with a first wing and a second wing extending in opposite directions from a drive shaft;

FIG. 2 is an elevational front view illustrating another embodiment of the wind blade device, constructed in accordance with the present invention, with the wings being bolted to the drive shaft;

FIG. 3 is a schematic top plan view illustrating wind direction and blade rotation for the wind blade device;

DETAILED DESCRIPTION OF THE PREFERRED EMBODIMENTS

Figure 7:
FIG. 7 is a top plan view illustrating the drive shaft of the wind blade device of FIG. 4, constructed in accordance with the present invention, with the drive shaft having a round opening.
Figure 6:
FIG. 6 is a top plan view illustrating the drive shaft of the wind blade device of FIG. 4, constructed in accordance with the present invention, with the drive shaft having a square opening.
Figure 5:
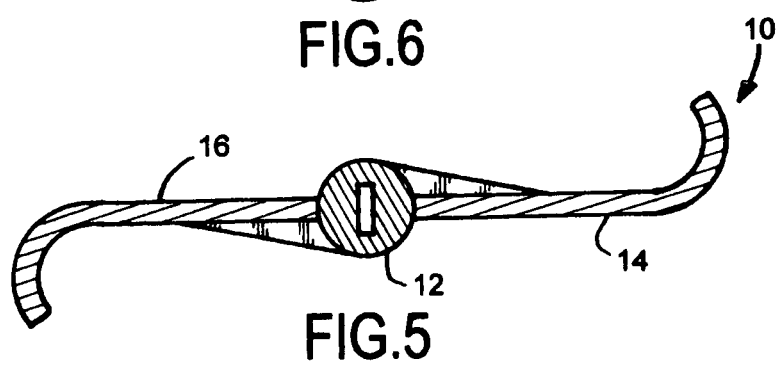
FIG. 5 is a top plan view illustrating the wind blade device of FIG. 4, constructed in accordance with the present invention, with the drive shaft having a rectangular opening.
Figure 4:
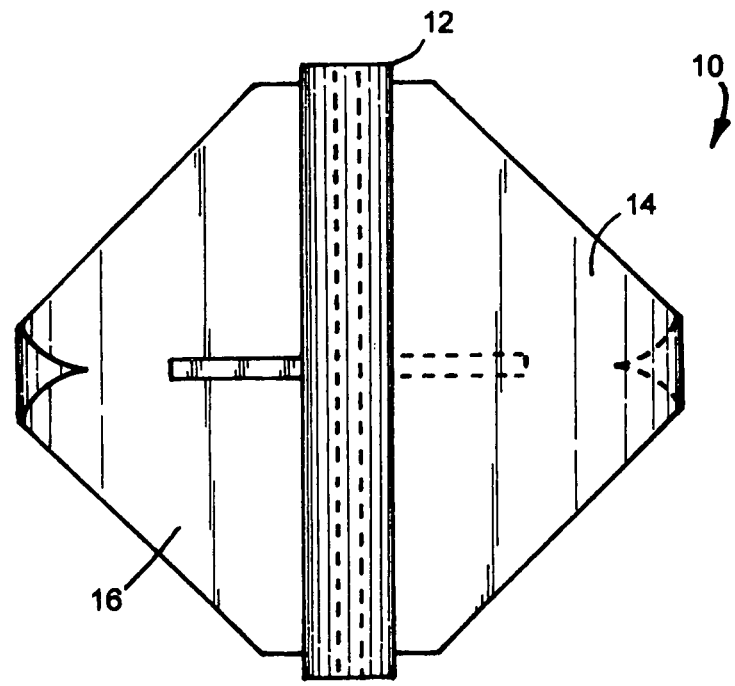
FIG. 4 is an elevational front view illustrating still another embodiment of the wind blade device, constructed in accordance with the present invention.

As illustrated in FIGS. 1-7, the present invention is a wind blade device, indicated generally at 10, for generating wind-generated electric power in residential, business, industrial, and electric utility applications. The wind blade device 10 of the present invention turns a vertical drive shaft of a vertical-axis wind turbine while presenting the greatest surface area to the wind, and receiving the wind from any direction.

The wind blade device 10 of the present invention has a drive shaft 12 with a first wing 14 extending from one side of the drive shaft 12 and a second wing 16 extending from an opposite side of the drive shaft 12. Each wing 14, 16 preferably have a substantially triangular shape with one side of the triangle secured to the drive shaft 12. The portion of each wing 14, 16 extending from the drive shaft 12 are substantially flat with the opposite tip of each triangular wing 14, 16 being curved thereby presenting itself as a reverse "S" from the top. The curved opposite tip of each wing 14, 16 forms an angle of approximately sixty degrees relative to the flat portion of each wing 14, 16 allowing a maximum amount of wind to actually be momentarily trapped within the curved opposite tips of both the first wing 14 and the second wing 16 thereby causing the drive shaft 12 to rotate. Preferably, the opposite tip of the first wing 14 and the opposite tip of the second wing 16 are curved in opposite directions thereby maximizing wind capture and drive shaft rotation 12.

Preferably, the drive shaft 12, the first wing 14, and the second wing 16 are constructed from a single piece of material although bolting or otherwise attaching the wings 14, 16 to the drive shaft 12 is within the scope of the present invention. In addition, the wind blade device 10 is preferably fabricated from a variety of lightweight, stiff, high-tensile strength metals, or in carbon, graphite, or other advanced composite fiber technologies. Further, as the wind blade device 10 has been designed for production in a wide variety of sizes to suit the generation needs of different classes of users, specifications such as dimensions, thicknesses, and engineering tolerances will likewise vary depending on the desires of the manufacturer and/or end user.

As mentioned above, the wind blade device 10 of the present invention viewed from the top presents itself as a reverse "S". The first wing 14 and the second wing 16 of the wind blade device 10 flare outward from either side of a cylindrical central drive shaft 12 or axis, and ending in the two ends of an "S" with one tip curling over the front of the vane, the other over the back. In an embodiment of the present invention, within the lee of the overlapping "S" element, the surface of the first wing 14 and the second wing 16, front and back, taper upward to the peripheral surface of the cylindrical axis. The vertical, cylindrical hub or axis 12 can be equipped with a smooth, rounded top and a receiving aperture, slot, or molded female coupling centered into its base. This slot mates with the generator's drive shaft which, as noted, will be oriented vertically within a housing, and drive a generator at a lower level. The wings 14, 16 of the wind blade device 10 extend outward in opposing triangles on either side of the central vertical drive shaft 12 axis. The tapering which was visible from above is not visible on the surface of the wind blade device 10, as the entire surface is contoured, smooth, and sealed. Finally, with regard to the drive shaft 12, a simple reverse gearing accommodates a switch from clockwise to counter-clockwise motion, depending on the direction of the wind. Given the large surface area of the wind blade device's 10 design, and the "S"-curled tips front and back, it is evident that the vane is extremely effective in catching winds from any direction, then spinning about the vertical axis, and driving the generator's drive shaft 12.

The wind blade device 10 of the present invention, a custom-designed vane or blade for vertical-axis wind turbines, presents a host of advantages and benefits. With a large surface area in relation to its vertical axis, the wind blade device 10 generates sufficient RPMs even at relatively low wind-speeds; and as noted, the unique "S"-shaped profile of the wind blade device 10 performs exceptionally in its capacity to harness the wind from any direction. Designed to be produced in a wide range of sizes, the wind blade device 10 can be used in household applications to generate emergency or auxiliary power; can be used for power generation or battery recharging on boats; and, in larger sizes for larger generators and towers, the wind blade device 10 can be used in industrial and electric-utility applications. But not only will the wind blade device 10 offer great adaptability in terms of size and efficiency, the wind blade device 10 also partakes of the advantages presented by vertical-axis wind turbines in general. In terms of efficiency, vertical-axis turbines capture a greater percentage of the energy in prevailing winds. In terms of power output, vertical-axis turbines provide greater torque at the drive shaft, as a function of blade size, than do horizontal-axis turbines. And in terms of cost, the simpler component design and assembly requirements of vertical-axis turbines allow individual homes, farms, and businesses to use smaller turbines to generate a portion of their electricity needs on-site. Vertical axis wind turbines cope with sudden changes, even reversals, in wind direction, just as a vertically shafted anemometer (wind speed-gauge), or wind vane does. Further, vertical-axis turbines are quieter, easier to maintain, and can be built with lower support-towers than their loftier, horizontal-axis counterparts. And because the blades of a vertical-axis turbine have no moving parts beyond their natural rotation in the wind, the drive shaft assembly and associated bearings are fixed vertically within the support structure, for easier access; while the generator can be located just below the turbine blades, at ground level, or even underground.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A wind blade device for rotating a wind turbine, the wind turbine generating wind-generated electric power in residential, business, industrial, and electric utility applications, the wind blade device comprising:
   a drive shaft mountable to the wind turbine;
   a first wing extending from one side of the drive shaft; and
   a second wing extending from an opposite side of the drive shaft;
   wherein at least a portion of the first wing distant from the drive shaft is curved in a first direction;
   wherein at least a portion of the second wing distant from the drive shaft is curved in a second direction;
   wherein each wing has a substantially triangular shape with one side of each wing secured to the drive shaft; and
   wherein the first wing and the second wing maximize surface area to the wind and receive the wind from any direction.

2. The wind blade device of claim 1 wherein the wind turbine is a vertical-axis wind turbine, the drive shaft mountable to the vertical-axis wind turbine.

3. The wind blade device of claim 1 wherein a portion of each wing extending between the drive shaft and the curved portion is substantially flat.

4. The wind blade device of claim 3 wherein the first direction is opposite the second direction.

5. The wind blade device of claim 4 wherein the curved opposite tip of each wing forms an angle of approximately 60° degrees relative to the flat portion of each wing thereby allowing a maximum amount of wind to actually be momentarily trapped within the curved opposite tips of both the first wing and the second wing thereby causing the drive shaft to rotate.

6. The wind blade device of claim 1 wherein the drive shaft, the first wing, and the second wing are constructed from a single piece of material.

7. The wind blade device of claim 1 wherein the wind blade device is fabricated from a material selected from the group consisting of lightweight, stiff, high-tensile strength metals, carbon, graphite, and advanced composite fiber technologies.

8. A method for rotating a wind turbine, the wind turbine generating wind-generated electric power in residential, business, industrial, and electric utility applications, the method comprising:

mounting a drive shaft to the wind turbine;

mounting a side of a substantially triangular shaped first wing from one side of the drive shaft;

mounting a side of a substantially triangular shaped second wing from an opposite side of the drive shaft;

curving at least a portion of the first wing distant from the drive shaft in a first direction;

curving at least a portion of the second wing distant from the drive shaft in a second direction;

maximizing the surface area of the first wing and the second wing; and receiving the wind from any direction.

9. The method of claim 8 wherein the wind turbine is a vertical-axis wind turbine, and further comprising:

mounting the drive shaft to the vertical-axis wind turbine.

10. The method of claim 8 wherein a portion of each wing extending between the drive shaft and the curved portion is substantially flat.

11. The method of claim 10 wherein the first direction is opposite the second direction.

12. The method of claim 11 and further comprising:

forming an angle of approximately 60° degrees between the curved opposite tips and the flat portion of each wing;

allowing a maximum amount of wind to actually be momentarily trapped within the curved opposite tips of both the first wing and the second wing; and rotating the drive shaft.

13. The method of claim 8 and further comprising:

constructing the drive shaft, the first wing, and the second wing from a single piece of material.

14. The method of claim 8 and further comprising:

fabricating the wind blade device from a material selected from the group consisting of lightweight, stiff, high-tensile strength metals, carbon, graphite, and advanced composite fiber technologies.

15. A wind blade device for rotating a wind turbine, the wind turbine generating wind-generated electric power in residential, business, industrial, and electric utility applications, the wind blade device comprising:

a drive shaft mountable to the wind turbine;

a triangular-shaped first wing extending from one side of the drive shaft, the first wing secured to the drive shaft along one side of the first wing; and a triangular-shaped second wing extending from an opposite side of the drive shaft, the second wing secured to the drive shaft along one side of the second wing;

wherein at least a portion of the first wing distant from the drive shaft is curved in a first direction;

wherein at least a portion of the second wing distant from the drive shaft is curved in a second direction, the first direction being substantially opposite the second direction; and wherein the first wing and the second wing maximize surface area to the wind and receive the wind from any direction.

16. The wind blade device of claim 15 wherein a portion of each wing extending between the drive shaft and the curved portion is substantially flat.

17. The wind blade device of claim 16 wherein the curved opposite tip of each wing forms an angle of approximately 60° degrees relative to the flat portion of each wing thereby allowing a maximum amount of wind to actually be momentarily trapped within the curved opposite tips of both the first wing and the second wing thereby causing the drive shaft to rotate.

18. The wind blade device of claim 15 wherein the drive shaft, the first wing, and the second wing are constructed from a single piece of material.

\* \* \* \* \*